United States Patent [19]

Isii

[11] Patent Number: 5,079,793
[45] Date of Patent: Jan. 14, 1992

[54] WIPER DEVICE WITH OSCILLATION PREVENTION SWITCH

[75] Inventor: Yosinori Isii, Yokohama, Japan

[73] Assignee: Jidosha Denki Kogyo K.K., Kanagawa, Japan

[21] Appl. No.: 437,131

[22] Filed: Nov. 16, 1989

[30] Foreign Application Priority Data

Nov. 17, 1988 [JP] Japan .................. 63-150434

[51] Int. Cl.[5] ............... B60S 1/04; B60S 1/32
[52] U.S. Cl. ............... 15/250.19; 15/250.34; 15/250 R; 318/DIG. 2
[58] Field of Search ......... 15/250.19, 250.31, 250.34, 15/250.35, 250.18, 250.12, 250 R; 318/DIG. 2

[56] References Cited

U.S. PATENT DOCUMENTS 3,011,200 12/1961 Bignon ............... 15/250.34
4,091,494 5/1978 Dunhill et ai. ............... 15/250.19
4,144,614 3/1979 Barbee ............... 15/250.19

FOREIGN PATENT DOCUMENTS 882809 7/1953 Fed. Rep. of Germany ... 15/250.19

Primary Examiner—Timothy F. Simone
Assistant Examiner—Gary K. Graham
Attorney, Agent, or Firm—Sughrue, Mion, Zinn Macpeak & Seas

[57] ABSTRACT

A wiper device is provided with a wiper arm including an arm head, a retainer and a coil spring, and with a lock-back detecting device which detects whether or not the wiper arm is in a "lock-back" state and shuts off a power supply to the motor in case of detecting the wiper arm to be in the "lock-back" state. This device makes it possible to prevent a vehicle hood from being hit by the wiper arm or the wiper blade.

1 Claim, 4 Drawing Sheets

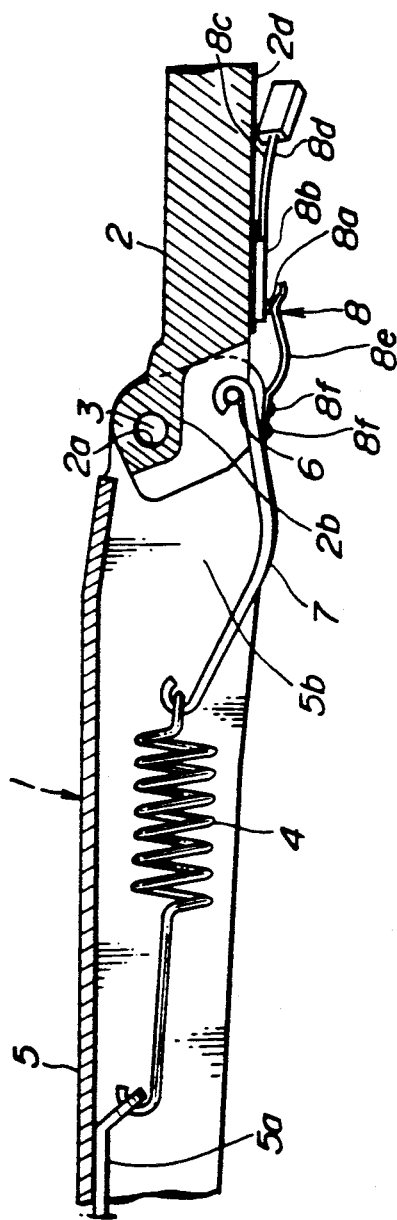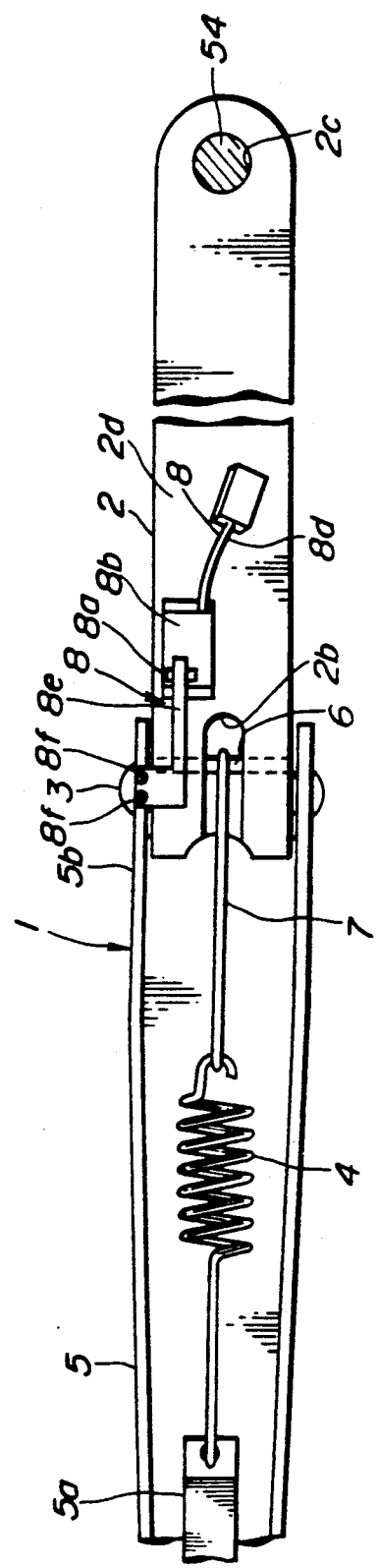

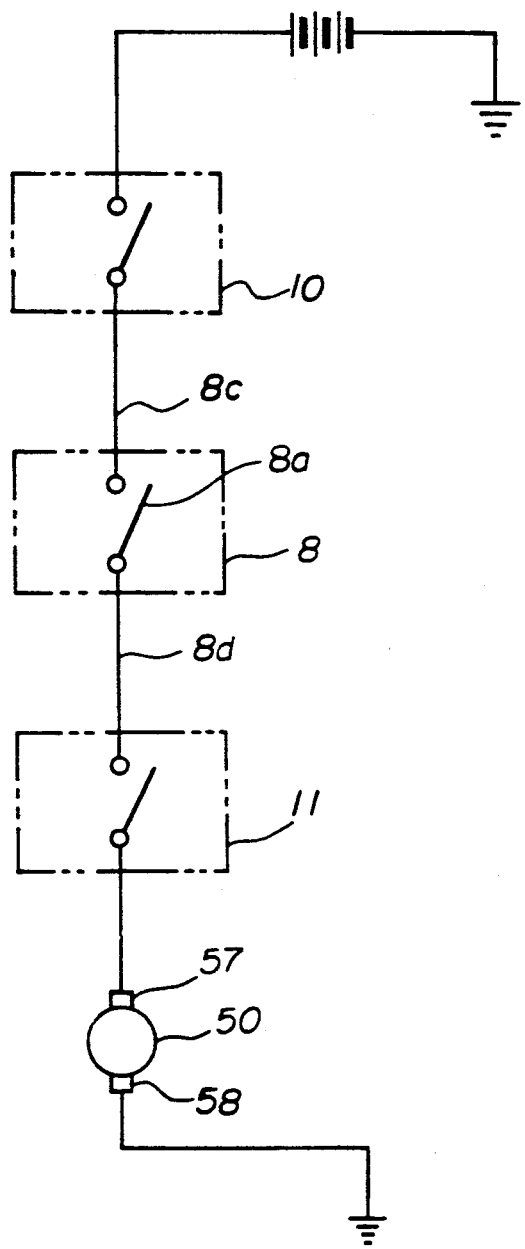
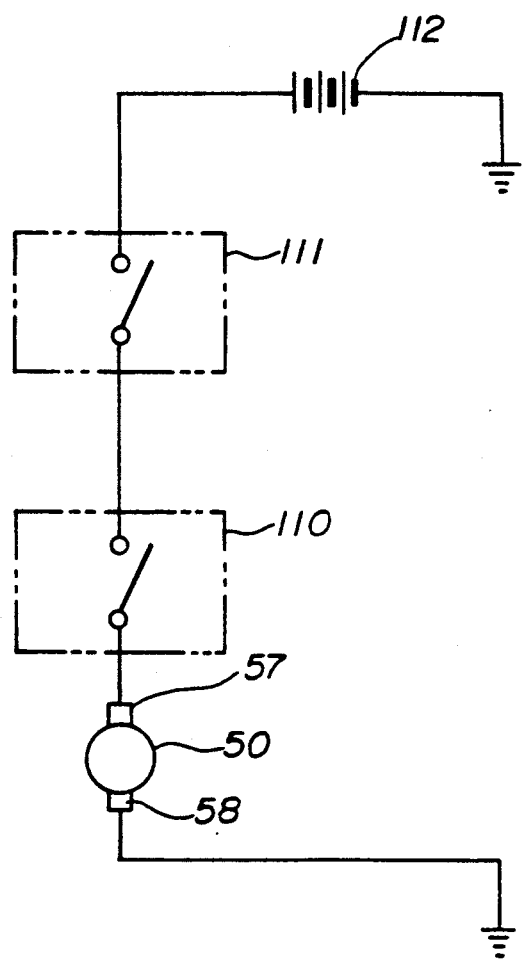

WIPER DEVICE WITH OSCILLATION PREVENTION SWITCH

BACKGROUND OF THE INVENTION

1. Field of The Invention

This invention relates to a wiper device having a wiper arm which has a wiper blade and is used for wiping a windshield by moving in an oscillatory mode on the windshield by means of a driving motor.

2. Description of The Prior Art

Heretofore, there has been used a wiper device as shown in FIG. 5 to FIG. 7, for example.

In the wiper device shown in the figures, an output shaft 51 of a motor 50 is connected through a linkage L (not shown) to a wiper pivot 54 fixed on a panel 53 of a vehicle body on the lower side of a hood 52 in FIG. 5, and said wiper pivot 54 is attached with a wiper arm 100 provided with an arm head 101 and a retainer 102.

Said arm head 101 is attached with the retainer 102 through a shaft 103 and can be pivoted upwardly in order to keep the retainer in a "lock-back" state, and with a coil spring 105 connected with a connector 104 and stretched from a pin 101a provided to the arm head 101 over a hook 102a provided to the retainer 102.

The retainer 102 is so designed as to attach a wiper blade at the top end thereof (see FIG. 6), and so structured as to press the wiper blade 55 onto a windshield 56 by the tension of the coil spring 105 provided to the wiper arm 100.

Additionally, said "lock-back" means maintains the retainer of the wiper arm pivoted upwardly and keeps the wiper blade attached to the retainer from the wiped surface on the windshield in case of snowfall, freezing or during car washing, for example.

An electric circuit to be connected with said wiper device will be described below on basis of a schematic circuit diagram shown in FIG. 7. A terminal 57 of the motor 50 is connected to a contact of a wiper switch 110 and another contact of said wiper switch 110 is connected to one of contacts of an ignition switch 111, furthermore another contact of said ignition switch 111 is connected to a power source 112 and another terminal 58 of the motor 50 is grounded.

Upon, switching on the wiper switch 110 when the ignition switch 111 is in the ON-state, the power source 112 is connected to the motor 50 and an output shaft 51 of the motor 50 rotates.

By the rotation of the output shaft 51 of the motor 50, the rotational motion of the output shaft 51 is converted into the reciprocative rotation of the wiper pivot 54, thereby the wiper arm 100 oscillates round the wiper pivot 54 as the center on the windshield 56 and makes the wiper blade 55 in wiping operation between position A and B.

Upon, switching off the wiper switch 110, the ouput shaft 51 of the motor 50 rotates in the reverse direction by a wiper blade-housing mechanism (not shown) provided to the motor 50 and when the wiper blade 55 arrives at a position A on the windshield 56, the wiper blade 55 shifts to a position C lower than the position A on the windshield 56 and is housed in the lower side of the hood 52.

In case of making the wiper arm 100 in the "lock-back" state in order to exchange the wiper blade 55, or to prevent the wiper blade 55 from adherence owing to freezing by keeping the wiper balde 55 apart from the windshield 56, the wiper blade 55 can be stopped at a position on the way by switching off the ignition switch 111 when the wiper blade 55 shifts to a position near to the position B above the position A on the windshield 56 by switching on the wiper switch 110 once after switching on the ignition switch 110.

Then, the retainer 102 and the wiper blade 55 are detached from the windshield 56 by raising the retainer 102 of the wiper arm 100 up to the position shown with two-dot chain lines in FIG. 5 around the shaft 103 of the arm head 101 as the center point, and become locked in this position because a point of action the other side of the shaft 103 toward the hood 52.

However, since the conventional wiper device described above has no means for detecting whether or not the wiper arm is in the "lock-back" state, switching on the wiper switch 110 at a state in which the ignition switch 111 is switched on and the wiper arm 100 remains in the "lock-back" state, the output shaft 51 of the motor 50 rotates in the reverse direction in order to shift the wiper blade 55 to the position C on the windshield and to house it in the lower side of the hood 52 by the wiper blade housing mechanism (not shown) of the motor 50. Therefore there is a problem since the wiper blade 55 or the wiper arm 100 hits against the hood 52 and damages the hood 52.

SUMMARY OF THE INVENTION

The present invention is made in view of the above mentioned problem of the prior art and it is an object to provide a wiper device which is able to prevent the hood from flaws caused by the wiper blade or the wiper arm.

The construction of the wiper device according to this invention for attaining the above-mentioned object is characterized by having a wiper arm comprising an arm head attached to a wiper pivot connected to a motor and rotating reciprocatively, a retainer connected to said arm head through a shaft to allow pivotal movement upwardly in order to keep the wiper arm in a lock-back state and a coil spring laid between said arm head and said retainer, and a lock-back detecting means for detecting whether or not said wiper arm is in the lock-back state and for shutting off a power supply to said motor when the wiper arm is detected to be in the lock-back state.

In the wiper device according to this invention, the lock-back detecting means is so designed as to detect whether or not the wiper arm is in the "lock-back" state, and so structured as not to rotate said motor in the case of detecting the wiper arm to be in the "lock-back" state. Consequently, neither the wiper blade nor the wiper arm hits on the hood.

BRIEF DESCRIPTION OF THE DRAWINGS

FIG. 1 is a vertical sectional side view showing the wiper device according to an embodiment of this invention;

FIG. 2 is a bottom view of the wiper arm in the wiper device shown in FIG. 1;

FIG. 4 is a schematic circuit diagram of the wiper device shown in FIG. 1;

FIG. 7 is a schematic circuit diagram of the wiper device shown in FIG. 5.

DESCRIPTION OF THE PREFERRED EMBODIMENT

A wiper device according to an embodiment of this invention will be described below on basis of FIG. 1 to FIG. 4.

Figure 5:
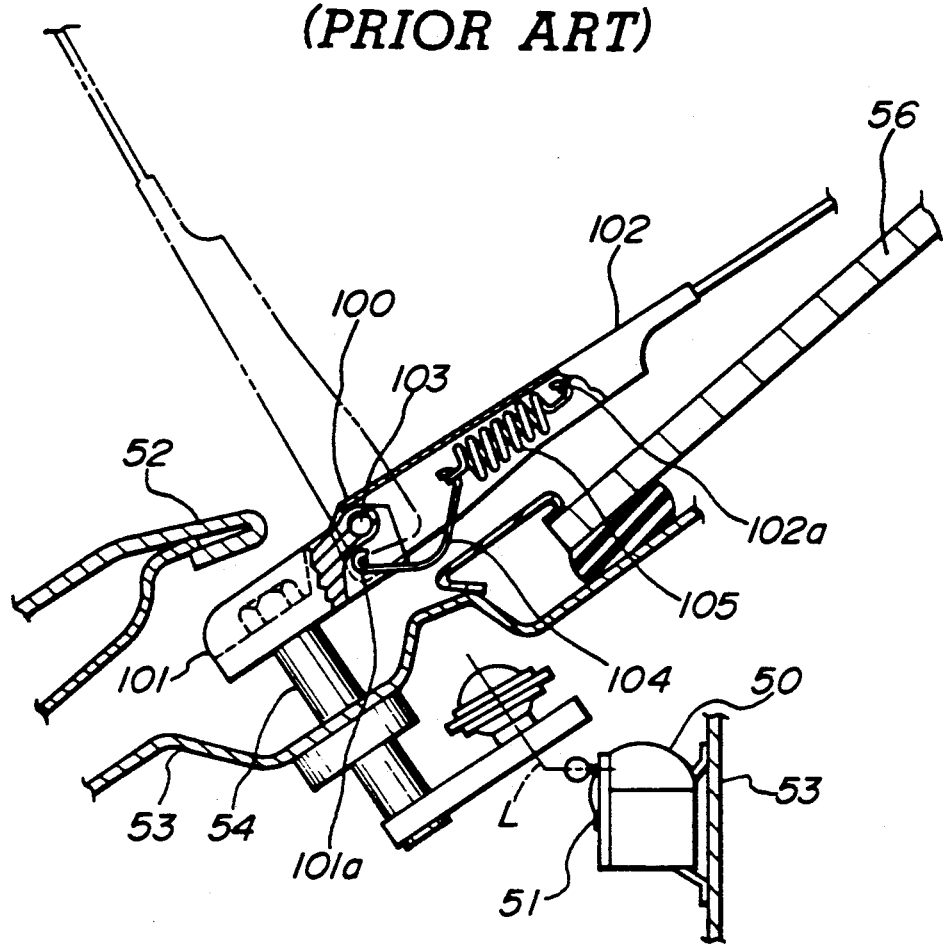
FIG. 5 is a side view of the conventional wiper device.

In the wiper device shown in the figures, a wiper arm 1 is provided with an arm head 2 attached to the wiper pivot 54 connected to the output shaft 51 of the motor 50, a retainer 5 connected to said arm head 2 through a shaft 3 for pivoting upwardly to a "lock-back" state, and a coil spring 4 laid between said arm head 2 and said retainer 5 in the same manner as shown FIG. 5. The wiper arm 1 is so structured as to oscillate on the windshield 56 (see FIG. 5) by the rotation of the motor 50.

The arm head 2 provided to the wiper arm 1 supports the shaft 3 in a shaft hole 2a disposed at an end part thereof on the left side in FIG. 1, and is fixed with a pin 6 in a cutout portion 2b.

Additionally, said arm head 2 is provided with a pivot setting hole 2c to fit on said wiper pivot 54 at another end part thereof on right side in FIG. 2.

Figure 6:
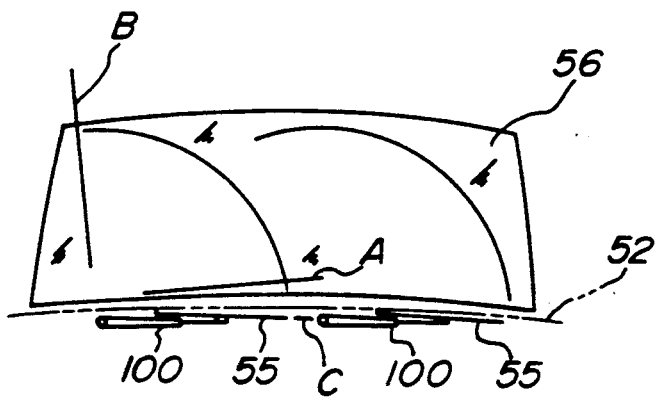
FIG. 6 is a front view of the wiper device shown in FIG. 5.

The retainer 5 provided to the wiper arm 1 is fixed with said shaft 3 at an end part thereof on the right side in FIG. 1, and is provided with a hook 5a on the left side in FIG. 1 and with the wiper blade 55 (not shown) at another end thereof on the left side in FIG. 1 in the same manner as shown in FIG. 6.

The coil spring 4 connected with a connector 7 having hook shaped opposite ends is stretched between the hook 5a and the pin 6 fixed to the arm head 2, so that the retainer 5 is energized in the anticlockwise direction in FIG. 1 around the shaft 3 provided to the arm head 2 as the center point.

A lock-back detecting means is provided between said arm head 2 and the retainer 5 which detects whether or not the wiper arm 1 is in the "lock-back" state and shuts off a power supply to the motor 50 in case of detecting the wiper arm 1 to be in the "lock-back" state.

Namely, said arm head 2 is provided with a microswitch 8b having a moving contact 8a on a bottom face 2d near to the left side end in FIG. 1, and an on-off signal of the switch by said moving contact 8a is output through connecting wires 8c, 8d.

A contacting piece 8e is secured by screws 8f on a side wall 5b of the retainer near to the right side end in FIG. 1 and is movable into and out of engagement with said contact 8a.

Figure 3:
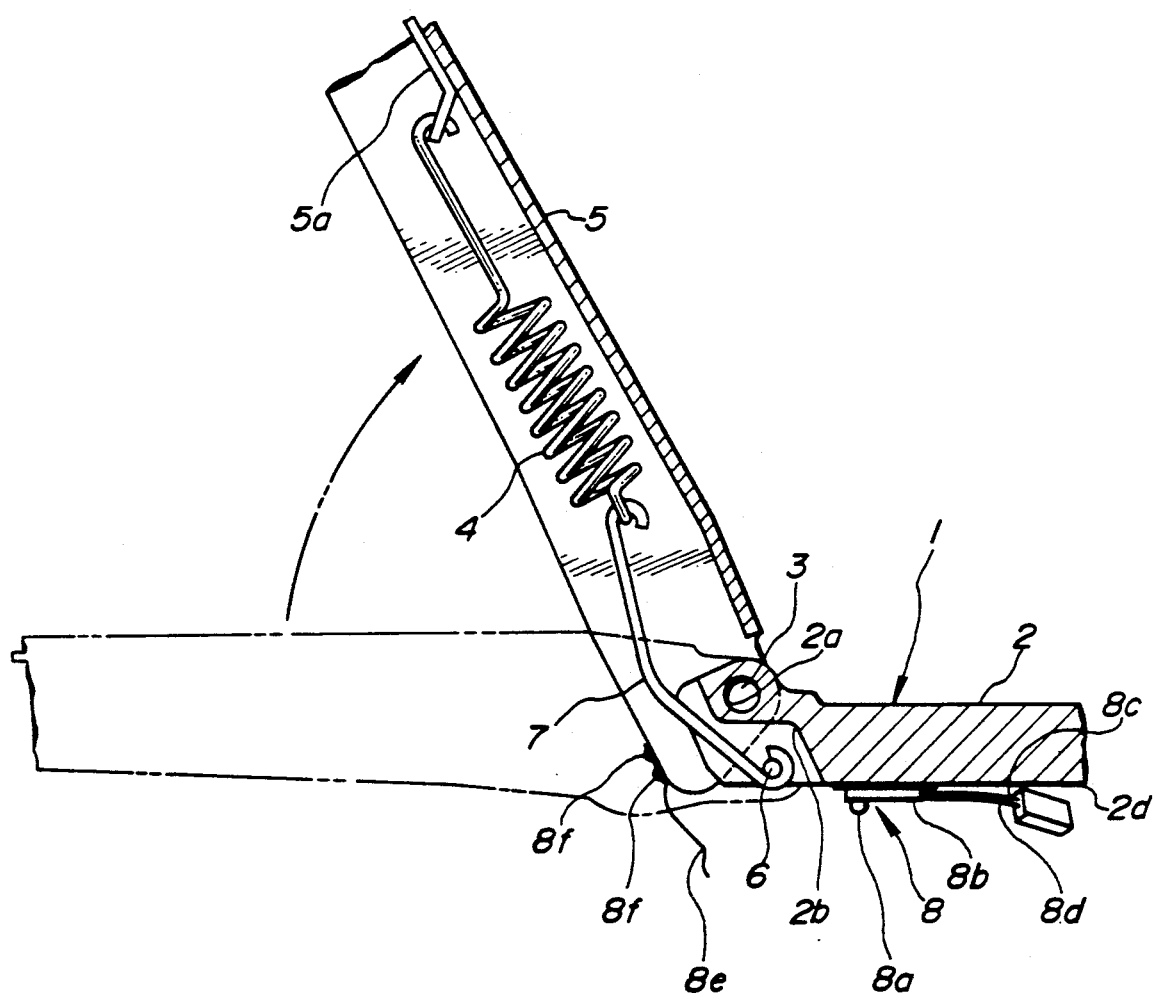
FIG. 3 is a vertical sectional side view illustrating the "lock-back" state of the wiper arm in the wiper device shown in FIG. 1.

When the wiper arm 1 is not in "lock-back" state as shown in FIG. 1, the microswitch 8b is switched on since the movable contacting piece 8e attached to the retainer 5 is in contact with the moving contact 8a of the microswitch 8b attached to the arm head 2. The microswitch 8b is switched off when the wiper arm 1 is in "lock-back" state as shown in FIG. 3 since said movable contacting piece 8e is out of contact with said moving contact 8a.

An electric circuit of the wiper device will be described below on basis of a schematic circuit diagram shown in FIG. 4. A power source 9 is connected to an ignition switch 10, said ignition switch 10 is connected to a connecting wire 8c of the lock-back detecting means 8, and another connecting wire 8d of the lock-back detecting means 8 is connected to a wiper switch 11. Furthermore the wiper switch 11 is connected to a terminal 57 of the motor 50 and another terminal 58 of the motor 50 is grounded.

Then, in the case the ignition switch 10 is switched on, switching the wiper switch 11 on, a circuit is established from a power source through the ignition switch 10 to the lock-back detecting means 8 to the wiper switch 11 to the motor 50 to ground, thereby the motor 50 rotates in the foward direction because the microswitch 8b of the lock-back detecting means 8 is switched on as shown in FIG. 1 when the wiper arm 1 is not in "lock-back" state.

By the rotation of the motor 50, the wiper arm 1 oscillates on the windshield 56 in the same manner as shown in FIG. 6, and moves the wiper blade 55 attached to the retainer 5 provided to the wiper arm 1 in wiping operation between the positions A and B on the windshield 56.

In this state, switching the wiper switch 11 off, the motor 50 rotates in the reverse direction by a wiper blade-housing mechanism (not shown) provided to the motor 50 when the wiper blade 55 arrives at a position A on the windshield 56, thereby the wiper blade 55 shifts to a position C lower than the position A on the windshield 56 and is housed in the lower side of the hood 52. In the case of keeping the wiper blade 55 off from the windshield 56 in order to exchange the wiper blade 55 or to prevent the wiper blade 55 from freezing on the windshield 56 in the winter season, the motor 50 is not supplied with electric power and remains stopped even if the wiper switch 11 is switched on at the ON-state of the ignition switch 10 because the microswitch 8b of the lock-back detecting means 8 is switched off as shown in FIG. 3 when the wiper arm 1 is in "lock-back" state.

Furthermore from this state, returning the wiper arm 1 to the state in which the wiper arm 1 is not in "lock-back" state, and switching on the wiper switch 11 at ON-state of the ignition switch 10, the wiper blade 55 shifts to the position C lower than the position A on the windshield 56 and is housed in the lower side of the hood 52.

As mentioned above, the wiper device according to this invention has a wiper arm comprising an arm head attached to a wiper pivot connected to a motor and rotating reciprocatively, a retainer connected to said arm head through a shaft for pivoting upwardly in order to keep the wiper arm in a lock-back state and a coil spring laid between said arm head and said retainer, and a lock-back detecting means for detecting whether or not said wiper arm is in the lock-back state and for shutting off a power supply to said motor when the wiper arm is detected to be in the lock-back state. Therefore, in case the wiper arm is "lock-back" state, the motor is not supplied with electric power and never rotates in forward direction or reverse direction even if the wiper switch is switched on at an ON-state of the ignition switch, so that the wiper arm is never actuated. Consequently, an excellent effect is obtained since it is able to prevent the wiper blade or the wiper arm from flaws.

What is claimed is:

1. A wiper device comprising:
    an arm head attached to a wiper pivot;
    a motor connected to said wiper pivot for oscillating said arm head;

a retainer pivotally connected to said arm head by means of a shaft to permit pivoting of said retainer from a aligned position with said arm head to a lock-back position substantially perpendicular to said arm head;

spring means connected between said arm head and said retainer for selectively biasing said retainer to said respective positions;

switch means connected to said motor for shutting off power to said motor when said retainer is in said lock-back position, said switch means being comprised of a microswitch mounted on a lower face of said arm head; and a movable contacting piece mounted on a lower face of said retainer in contact with said microswitch disposed on said arm head when said retainer is in said aligned position and out of contact with said microswitch when said retainer is in said lock-back position.

* * * * *